May 20, 1930.  H. B. SPENCER ET AL  1,759,211
GREASE CUP
Filed Nov. 5, 1928
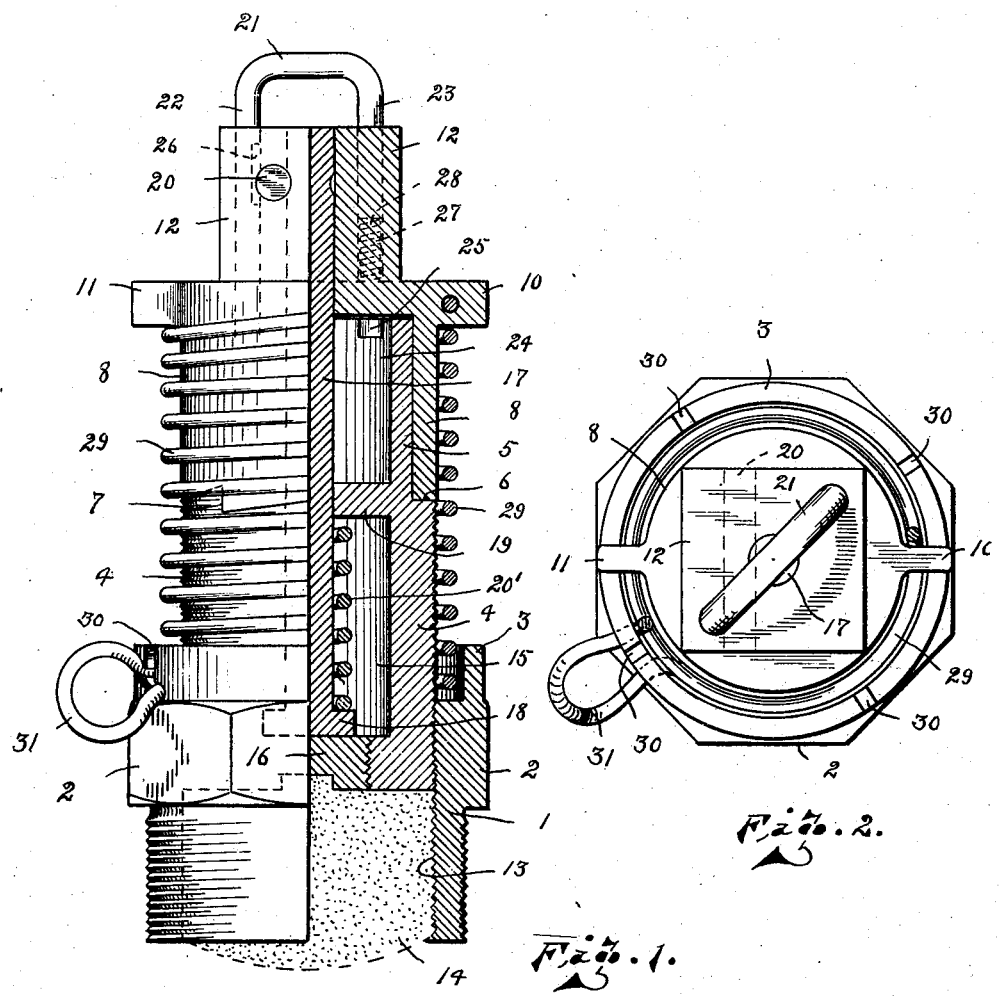
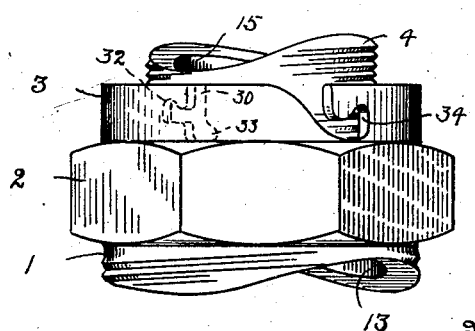
Inventor
Hugh B. Spencer.
Wm R. Smith.
Geo Stevens.
Attorney Patented May 20, 1930

1,759,211

UNITED STATES PATENT OFFICE

HUGH B. SPENCER, OF DULUTH, MINNESOTA, AND WILLIAM R. SMITH, OF WINNIPEG, MANITOBA, CANADA

GREASE CUP

Application filed November 5, 1928. Serial No. 317,419.

This invention relates to plug controlled grease cups, the principal object being to provide a more practical and efficient device of this character.

Another object is to provide such a plug of exceptional delicacy of adjustment.

Still other objects and advantages of the invention will appear in the further description thereof.

Referring now to the accompanying drawing, forming part of this application, and wherein like reference characters indicate like parts:

Figure 1 is a combination side elevation and sectional view of one of the completely assembled plugs having grease therein;

Figure 2 is a top plan view of the plug;

Figure 3 is a fragmental portion of the plug showing modified forms of spring catches.

1 represents the grease containing plug or receptacle which is externally screw threaded upon its lower extremity for application to the object which is to be lubricated, such as a locomotive connecting rod or the like and having formed above said screw threaded portion the polygonal portion 2 for the use of a wrench or the like in the application of the plug. Above this nut portion 2 is formed an upstanding annular flange 3 circumventing and spaced from the upwardly extending cylindrical portion 4 of the plug body, said portion being screw threaded within the plug 1 for feeding grease therethrough.

The cylindrical body portion of the plug is of two different external diameters, the upper portion 5 thereof being less in diameter than the lower portion indicated at 4, and the annular shoulder indicated at 6 formed by such stepping is notched circumferentially as at 7, forming the lower half of a clutch-like surface for cooperative engagement with the similarly shaped lower face of the external barrel portion 8 of the cap 9 of the plug. This cap 9 is of hollow cylindrical form carrying two opposed radially projecting lugs 10 and 11, the object of which will be explained later, and the squared crown portion 12.

The grease containing chamber of the plug is indicated at 13 and the grease therein at 14. An internally screw threaded hole is formed centrally of the upper end of the grease chamber communicating with the chamber 15 of the cylindrical body portion of the plug, and said hole is shown as being closed by the screw threaded plug 16.

There is however installed within the cylindrical body portion of the plug the reciprocable pitman 17 having a head 18 thereupon and carrying externally thereof and intermediate of the head and the central transverse wall 19 the expansive helical spring 20', normally holding the pitman in its lowermost position as illustrated. This pitman extends upwardly through the cap and crown thereof and is held in fixed relation to the cap and crown by means of the transverse rod or key 20 installed within the crown 12, the pitman having an annular arcuately shaped key seat therein for the registration of the key 20.

Thus when the cap is rotated in an anti-clockwise direction, or backwardly, in respect to the cooperative notches 7 of the parts 4 and 8 of the barrel, the cap together with the pitman 17 will be raised, contracting the helical spring 20', and this occurs until one complete step of the notched cooperative portions has been accomplished, when the expansive effect of the spring 20' will instantly function in reregistering the cooperative notched portions of the two parts of the body of the plug.

A locking device for the two parts of the plug, when it becomes desirable to unscrew same, is provided in the form of a staple like vertically reciprocable key 21 mounted within the crown 12 of the plug, the two depending legs of the key being disposed in diagonally opposite corners of the crown as clearly seen in Figure 2 of the drawings. One leg 22 of the key is longer than the leg 23 thereof, and extends within a through hole having access to the uppermost chamber 24 of the body portion of the plug for selective engagement with semi-circularly shaped recesses 25 formed within the inner face of the uppermost edge of the portion 5 of the body of the plug; there being four of such recesses equidistant circumferentially about the body portion 5. The leg 22 of the key is made to pass through the path of the key 20, and to avoid engagement therewith is provided with a vertically elongated notch 26 formed in the side thereof next the key 20, so that when the latter key is in position in the crown of the cap it acts as a keeper for the key 21 but does not interfere with its vertical adjustment in engaging or disengaging the body portion 5. The key 21 is retained in inoperative relation to the barrel 25 by the short legs 23 thereof being installed within a hole 27 in the crown of the cap, and in the bottom of which hole is placed the small expansive helical spring 28 which keeps a constant upward stress upon the key 21, so that the leg 22 thereof is out of engagement with any of the recesses 25 in the body of the plug. Consequently when it becomes desirable to unscrew the body or cylindrical portion 4-5 from the plug, the same may be readily accomplished with a wrench on the crown 12 simultaneously with the depression of the key 21 into any one of the recesses 25, or if not too tight may be turned by a grasp of the hand with such depression of the key 21.

As a motive power for the feeding portion of the plug there is provided the usual helical spring 29 about the compound barrel portion 4-5, the upper end of the spring being hooked into a suitable hole through one of the lugs 10 in the cap of the plug, and the opposite end housed within the space intermediate of the annular flange 3 and the body portion, the lower terminal thereof being made to extend through suitable notches 30 in the flange 3 and looped as at 31 with preferably its very extreme terminal being hooked into an auxiliary notch 32 formed upon the opposite side of the main notch 30 to that engaged by the wire of the spring in entering the notch 30, and there is preferably formed a second auxiliary notch as indicated at 33 in the lowermost corner of the notch 30 opposite to the location of the notch 32.

The locking effect of such arrangement of such notches is evident in considering that the loop 31 of the spring is somewhat twisted or if preferred formed into plurality of spiral loops so that by its resiliency it is held firmly in the position shown in Figure 1.

As a modified form of notch we have shown same in Figure 3 as at 34 and wherein the looped terminal of the spring 29 may be engaged, the same ordinarily sufficing as a keeper therefor though it is obvious that the first mentioned notch may be deemed more dependable as a lock for the spring.

There are a plurality of notches 30 formed about the annular flange 3 so that adjustment of the spring 29 may be readily accomplished with the terminal 31 thereof projecting in any desired direction, for example away from an object alongside of the plug which may interfere with the convenient rotation of the terminal of the spring and in which event the adjustment of the compound barrel becomes efficacious.

From the foregoing it is evident that we have devised a practical plug for the purpose intended and one susceptible of extremely delicate adjustment; furthermore one of simple construction and which may be readily assembled or disassembled, the principal holding member of the separable parts being a single key readily adjustable.

Having thus described our invention, what we claim and desire to secure by Letters Patent, is:

1. The combination with a grease feeding receptacle comprising a grease containing plug, of a two-part feeding plug threaded within the grease plug, spring means for turning both parts of the feeding plug in one direction, and selective means for turning both parts in the opposite direction or but one of said parts for the purpose described.

2. In combination, a grease containing plug, a feeding plug carried by the grease plug, the body of said feeding plug being hollow and of two selectively rotatable parts, and adjustable spring means for automatically rotating the body of the feeding plug.

3. In combination a grease containing plug, a two-part feeding plug screw threadedly carried within the grease plug one part of said feeding plug being rotatable independently of the other part for applying intermittent rotatable stress thereupon, a spiral spring about said feeding plug for imparting rotative motion thereto and adjustable by the independently rotative part, other means for similarly adjusting the spring, and selective means whereby the two parts of the feeding plug may or may not be moved simultaneously.

4. In combination, a lubricant carrying plug, a feeding plug cooperatively carried by the first plug, a spiral spring for imparting action to the feeding plug, and two independent hand controlled means for predetermining the action of the spring.

5. In combination, a lubricant carrying plug, a feeding plug cooperatively carried by the first mentioned plug, a spiral spring for imparting action to the feeding plug, two separate hand controlled means for predetermining the action of the spring, one of said means carrying other selective means whereby to turn the feeding plug in either direction.

In testimony whereof we affix our signatures.

HUGH B. SPENCER.
WILLIAM R. SMITH.